United States Patent
Sauler et al.

(10) Patent No.: US 6,727,812 B2
(45) Date of Patent: Apr. 27, 2004

(54) METHOD AND DEVICE FOR ERROR DETECTION AND DIAGNOSIS IN A KNOCK SENSOR

(75) Inventors: Juergen Sauler, Stuttgart (DE); Oskar Torno, Schwieberdingen (DE); Axel Heinstein, Wimsheim (DE); Carsten Kluth, Stuttgart (DE); Werner Haeming, Neudenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/070,970

(22) PCT Filed: May 11, 2001

(86) PCT No.: PCT/DE01/01805

§ 371 (c)(1),
(2), (4) Date: Jun. 18, 2002

(87) PCT Pub. No.: WO02/04800

PCT Pub. Date: Jan. 17, 2002

(65) Prior Publication Data

US 2002/0179051 A1 Dec. 5, 2002

(30) Foreign Application Priority Data

Jul. 11, 2000 (DE) .......................................... 100 33 586

(51) Int. Cl.[7] .............................. G08B 29/00; F02P 5/00
(52) U.S. Cl. ...................... 340/511; 340/438; 340/439; 123/406.16; 701/111; 701/29; 73/35.01; 73/35.03; 73/35.06
(58) Field of Search .................... 340/511, 438, 340/439, 440; 701/29, 35, 99, 34, 101, 111; 73/35.01, 35.03, 35.04, 35.06, 570; 123/406.16, 406.17, 406.29

(56) References Cited

U.S. PATENT DOCUMENTS

| 4,467,634 A | * | 8/1984 | Rohde et al. ................ 123/425 |
| 5,038,735 A | * | 8/1991 | Hosoya et al. .............. 123/425 |
| 5,040,510 A | * | 8/1991 | Krebs et al. ................. 123/425 |
| 5,373,448 A | * | 12/1994 | Katogi et al. ................ 123/435 |
| 5,517,969 A | * | 5/1996 | Unland et al. ............... 123/425 |
| 6,279,536 B1 | * | 8/2001 | Brielbeck et al. ....... 123/406.35 |

FOREIGN PATENT DOCUMENTS

| DE | 41 17 807 | 12/1992 |
| WO | WO 94/01041 | 1/1994 |
| WO | WO 98/08760 | 3/1995 |

* cited by examiner

Primary Examiner—Donnie L. Crosland
(74) Attorney, Agent, or Firm—Kenyon & Kenyon

(57) ABSTRACT

A method and a device for fault detection or diagnosis may be used on a multi-cylinder internal combustion engine with a knock sensor. For diagnostic purposes an instantaneous reference value formed from the sensor signal may be compared with predefinable upper or lower reference threshold levels. If the instantaneous reference value exceeds or falls below the thresholds to a predefinable extent, a malfunction is detected. The reference levels correspond, for example, to the background noise present in knock-free operation. The fault detection or diagnosis may be performed only for the cylinder which emits the loudest noise or from which the loudest noise is recorded.

20 Claims, 2 Drawing Sheets

METHOD AND DEVICE FOR ERROR DETECTION AND DIAGNOSIS IN A KNOCK SENSOR

FIELD OF THE INVENTION

The present invention relates to a method and a device for fault detection or diagnosis in a knock sensor on a multi-cylinder internal combustion engine.

BACKGROUND INFORMATION

It is known that in order for knocking in an internal combustion engine to be regulated, the knocking must be reliably detected, with such detection ensuring that malfunctions of a knock sensor are reliably detected. Such knock sensors are assigned, for example, to each cylinder of the internal combustion engine. They emit an output signal which indicates whether or not knocking has occurred in the cylinder. Knocking involves instances of undesired combustion, which should be avoided.

International Published Patent Application No. WO 94/01041 describes a method for knock detection and for detection of faults in knock sensors. In this conventional method, engine speed-dependent normalized reference levels are formed from the output signals of the knock sensors, the latter being, for example, structure-borne noise sensors. As a function of the normalized reference levels, engine speed-dependent reference threshold levels are formed, with one engine speed-dependent upper reference threshold level and one engine speed-dependent lower reference threshold level being stored as a characteristic curve in the memory of the internal combustion engine's controller. The reference levels are formed such that they correspond to the noise level of the internal combustion engine in knock-free operation. The reference levels are set with the aid of integration of the output signals of the knock sensors, with determination of the reference levels being carried out under conditions under which no knocking occurs, for example within a predefinable measuring window.

For the purpose of the actual fault detection, in the conventional method each normalized instantaneous reference value is compared with the two engine speed-dependent reference threshold levels. In the event of a deviation, which may be predefined, of the normalized instantaneous reference level, a malfunction is detected. For example, a normalized instantaneous reference level that is below the lower reference threshold level indicates a drop-out of the knock sensor, such that no signal may proceed from it to the evaluation device. If the upper threshold level is exceeded, a malfunction of the sensor is again assumed, and appropriate replacement measures are initiated.

In order to be able to maintain a safety margin relative to the high background noise level which is caused by clatter, gas flow into the knock sensor line, etc., diagnosis is carried out only beyond a certain engine speed threshold, at which the normalized reference level is distant enough from the background noise for a reliable verification to be carried out.

SUMMARY

The method according to the present invention and the device according to the present invention for diagnosis of knock sensors may have the advantage that the engine speed threshold for the performance of diagnosis may be set lower than in the conventional fault detection method, without the reliability of the fault detection suffering. This may provide the advantage that early diagnosis of a knock sensor fault may be made at low engine speeds, rendering it possible for appropriate replacement measures to be initiated earlier, in order to protect the internal combustion engine reliably against damage.

These advantages are obtained by providing a method or a device for fault detection having the features as described herein. The description of the present invention is based on an internal combustion engine that has only one knock sensor, which is arranged at a predefinable point on the internal combustion engine or the engine block. Several knock sensors may also be provided, and in such case specific cylinders may be assigned to each knock sensor. For fault detection or diagnosis purposes, only the signal of the loudest cylinder is used. That is, the signal of the cylinder which is loudest at the location of the knock sensor. Determination of the cylinder in question occurs in operation or when the internal combustion engine is first placed into operation, with the loudest cylinder being determined by an arrangement for maximum value selection or by comparison of the reference levels obtained for the individual cylinders.

Further advantages of the present invention may be obtained by performing fault detection or diagnosis by comparison of the instantaneous reference level of the loudest cylinder with an upper and a lower reference threshold level. The reference threshold levels may be formed as a function of the reference level of the loudest cylinder and in addition may be engine speed-dependent. The maximum value selection in operation may occur by activation of a switch-over device. For purposes of regulating the knocking, all cylinders continue to be covered.

An example embodiment of the present invention is illustrated in the drawing and is explained in greater detail in the following description.

DETAILED DESCRIPTION

Figure 1:
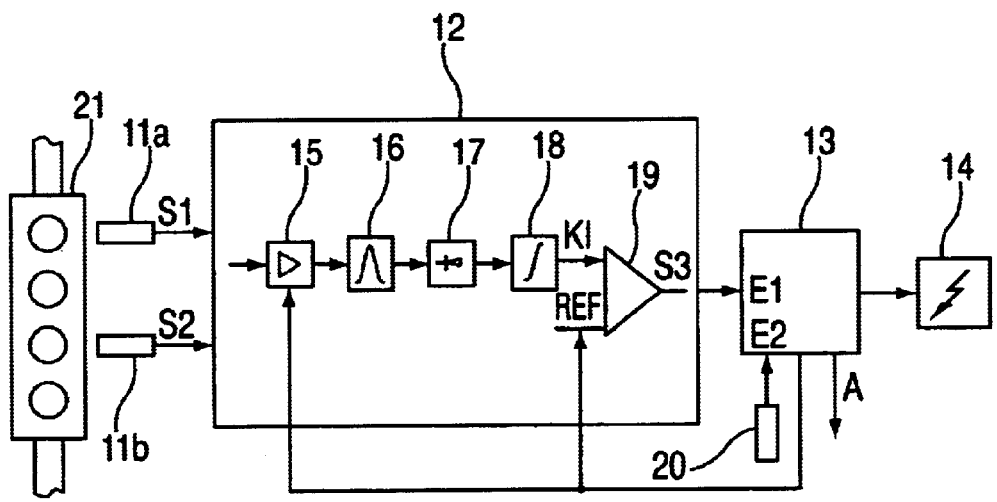
FIG. 1 illustrates a conventional device for knock detection which, with the additional features illustrated in FIG. 3, may be suitable for performing the method according to the present invention.

FIG. 1 illustrates a device for knock detection on an internal combustion engine, which is described in International Published Patent Application No. WO 94/01041. Such a device, with appropriate additional features, may be able to perform the method of fault detection according to the present invention and to initiate replacement measures in the event that a malfunction is detected.

In the device for knock detection illustrated in FIG. 1, two knock sensors 11a and 11b may be assigned to internal combustion engine 10 which is illustrated only schematically, the knock sensors being situated at predefinable points on the internal combustion engine. Knock sensors 11a and 11b supply signals S1 and S2 to an evaluation circuit 12 which may be linked with a micro-processor or computer 13 via input E1. The computer may be a part of a controller of the internal combustion engine. Supplementary signals, for example an engine speed signal n, may be supplied to computer 13 via an additional input E2. In response to the received signals, computer 13 activates, for example, the ignition output stages 14 of the internal combustion engine and/or further devices such as injection valves, etc., of the internal combustion engine, for example by emitting appropriate signals at output A. The entire evaluation circuit may also be completely integrated in computer 13 of the internal combustion engine's controller.

Evaluation circuit 12 contains in the example embodiment at least one amplifier 15 with an adjustable gain factor, to which output signals S1 and S2 provided by knock sensors 11a and 11b may be supplied alternately via a multiplexer 21. The signals may be processed in a downstream band pass filter 16 and a demodulation circuit 17, for example a rectifier, and may be finally integrated in integrator 18. The integrated signals are, or the resultant integrator value is, labeled as KI. Integrator value KI may be compared in a comparator 19 with a reference level. The result of the comparison indicates knocking if the value KI is higher than reference level Ref by predefinable amounts.

Comparator 19 or further comparing devices, to which signals KI and Ref may be supplied, may also used for fault detection or diagnosis. To this end, the instantaneous reference level or a normalized instantaneous reference level formed from it may be compared with an upper and a lower reference threshold level, and faults may be detected if this comparison shows that an instantaneous reference level is higher than the upper reference threshold level or is lower than the lower reference threshold level. The two reference threshold levels may be engine speed-dependent characteristic curves, with the reference threshold levels increasing with rising engine speed, since the noise emitted by the cylinders also increases as the engine speed rises.

In order to increase reliability in fault detection it is also stipulated that the state of being higher than the upper reference threshold level value or lower than the lower reference threshold level value may be maintained for an applicable duration.

In order to be able to maintain a safety margin relative to the background noise level, the fault detection or diagnosis may be performed only above a certain minimum engine speed nG, at which the reference threshold level is distant enough from the background noise. Such a minimum reference level Refmin thus requires a minimum engine speed nG.

Figure 2:
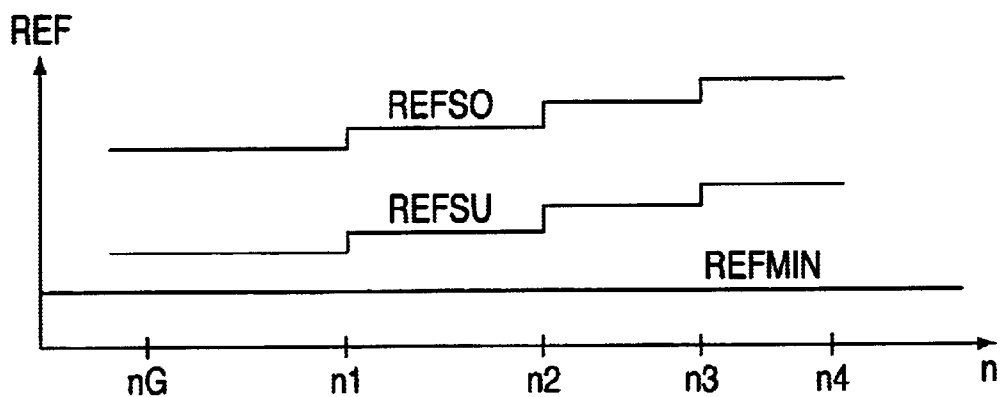
FIG. 2 illustrates upper and lower reference threshold levels plotted against the engine speed as an example.

An example of the characteristic curve of an upper and a lower reference threshold level related to the engine speed n and a minimum reference level is illustrated in FIG. 2.

The formation of the reference levels from the output signal of a knock sensor and the determination of the reference threshold levels from prior reference levels are described in greater detail in International Published Patent Application No. WO 94/01041.

In the case of internal combustion engines having only a single knock sensor, the differences in the reference levels which may be determined for specific cylinders may sometimes be very large. The differences in noise level between the inner and the outer cylinders may be considerable and may cause different reference levels to be obtained for each cylinder. The differences in noise level arise out of the differing distances of the individual cylinders from the point of installation of the knock sensor and out of differing transmission pathways for the structure-borne noise. For example, water ducts or oil ducts in the engine block, i.e., in the block of the internal combustion engine may affect the transmission of structure-borne noise. The noises generated in different cylinders may also be different. By limiting, in accordance with the present invention, the diagnosis to the loudest cylinder or cylinders or to the loudest noise recorded for a specific cylinder, lower reference threshold level REFMIN is moved further away from the background noise level, which is constant. As a result, the diagnosis may be performed starting from lower engine speeds than is the case with the conventional system, and earlier diagnosis of a knock sensor fault may be made possible. This means that replacement measures may be initiated earlier in order to protect the internal combustion engine from damage.

Selection of the loudest cylinder or of the loudest cylinder-specific noise and thus of the highest reference level occurs in operation or when the internal combustion engine is first placed into operation. To this end the noises occurring may be measured and the loudest noise, in other words the noise belonging to the loudest cylinder, is selected. By comparing the cylinder-specific output signals of the knock sensor with one another, it may be possible to determine the loudest cylinders in operation, or at the first placing into operation, or on the test bed. Such a maximum value selection may also occur on the basis of the reference values determined for specific cylinders.

Subsequently, the fault detection or diagnosis will be subsequently based on this cylinder. Knock detection, however, will continue to cover all cylinders.

Figure 3:
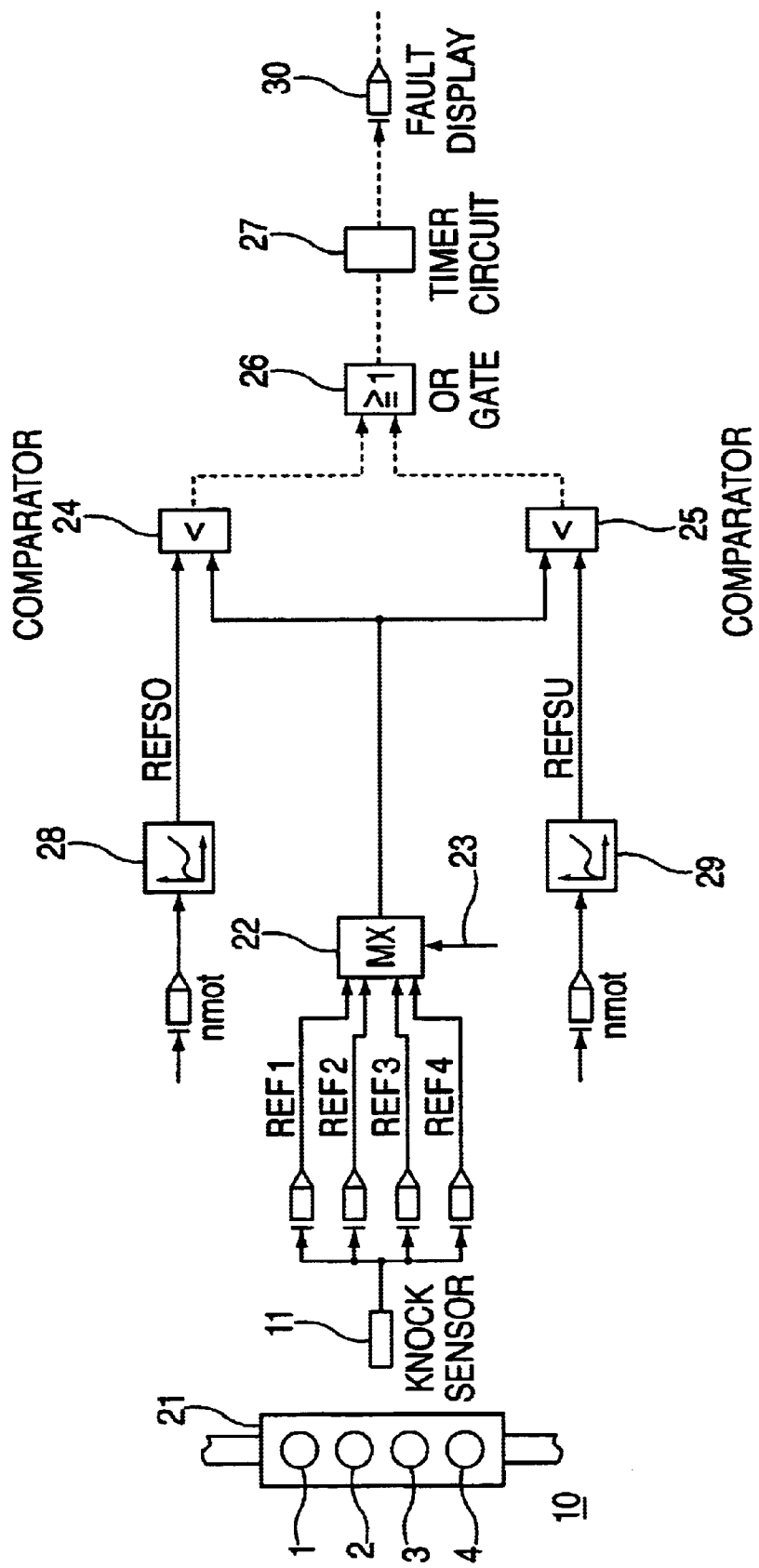
FIG. 3 illustrates an example embodiment of a device according to the present invention for knock sensor diagnosis or knock sensor fault detection by evaluation of the noise of the cylinder which generates the loudest noises at the location of the knock sensor and thus causes the highest output signal of the knock sensor.

In the example embodiment illustrated in FIG. 3, a single knock sensor 11 may be assigned to internal combustion engine 10 having four cylinders 1, 2, 3 and 4. Knock sensor 11 emits an output signal, which is dependent on the noises occurring in the cylinders. Cylinder-specific reference levels REF1 to REF4 may be formed from the output signal of knock sensor 11, with the formation of the reference levels occurring in accordance with the method described International Published Patent Application No. WO 94/01041. For fault detection or diagnosis purposes, only one reference level may be passed on to two comparators 24 and 25 via a maximum value selection device 22. Which reference level is to be passed on may be determined, for example, in operation by actuation of a switch in the maximum value selection circuit. This actuation may be indicated by arrow 23.

In comparators 24, 25 the instantaneous reference value of the loudest cylinder may be compared with upper reference threshold level REFSO and/or lower reference threshold level REFSU. The two reference threshold levels REFSO and/or REFSU may be formed as a function of the engine speed from the reference level of the loudest cylinder with, for example, prior reference levels of the same cylinder also being taken into account. The reference threshold levels may be, for example, formed in blocks 28 and 29 as a function of the supplied engine speed nmot and stored in an electronic memory device.

If one of the two comparisons shows that an impermissible value of the instantaneous reference level is present, a corresponding high signal may be supplied to OR gate 26, as a result of which a fault signal may be created at the output. The fault signal may be displayed on a fault display 30 and/or suitable measures to act on the ignition etc. may be initiated, thus placing the internal combustion engine in a safe operational condition. A timer circuit 27 may, if appropriate, cause the fault display to be activated only if the fault persists for a predefinable duration.

The example embodiment illustrated in FIG. 3 may be a component of evaluation circuit 12 or of computer 13 of the internal combustion engine's controller or may be an addition to it. If appropriate, the two loudest cylinders may also be selected.

A safety factor may additionally be incorporated in the fault detection, if appropriate, to permit fault detection only when the instantaneous reference level of the loudest cylinder exceeds the upper reference threshold level multiplied by that factor or falls below the lower reference threshold level multiplied by such a safety factor.

What is claimed is:

1. A method for one of (i) fault detection and (ii) fault diagnosis in a knock sensor which is assigned to the cylinders of a multi-cylinder internal combustion engine in a predefinable manner and which supplies an output signal dependent upon the noise recorded, comprising the steps of:
   one of (i) detecting a fault and (ii) diagnosing a fault on the basis of one of (i) at least one cylinder having a highest noise generation and (ii) at least one cylinder that supplies a loudest noise at the knock sensor; and
   detecting a fault if a noise-dependent instantaneous value one of (i) exceeds at least one predefinable upper threshold level and (ii) falls below a predefinable lower threshold value.

2. The method according to claim 1, further comprising the step of selecting the loudest cylinder when the internal combustion engine is first placed into operation.

3. The method according to claim 1, further comprising the step of selecting the loudest cylinder by one of measurement of a noise level on a test bed and comparison of one of the output signals emitted from individual cylinders and reference values derived from the output signals emitted from individual cylinders.

4. The method according to claim 3, wherein the fault detecting step includes the substeps of detecting fault on the basis of reference levels formed from predefinable output signals of the knock sensor and detecting fault if an instantaneous reference level one of (i) exceeds an upper reference threshold level and (ii) falls below a lower reference threshold level in a predefinable manner.

5. The method according to claim 4, wherein the reference threshold levels are formed from prior reference levels of the loudest cylinder.

6. The method according to claim 4, wherein the fault detecting step includes the substep of detecting fault only when the reference level one of exceeds an upper reference threshold level multiplied by at least one predefinable factor determining a safety range and drops below a lower reference threshold level multiplied by a second factor.

7. The method according to claim 1, wherein the fault detecting step includes the substep of detecting fault only if a fault condition persists for longer than a predefinable applicable period.

8. The method according to claim 1, wherein the threshold levels are stored in an electronic memory device as engine speed-dependent characteristic curves.

9. The method according to claim 1, further comprising the step of initiating, when a fault is detected, replacement measures to ensure safe operation of at least one of the internal combustion engine and a display.

10. A device for one of (i) fault detection and (ii) fault diagnosis in a knock sensor assigned to cylinders of a multi-cylinder internal combustion engine in a predefinable manner and supplies an output signal dependent upon the noise recorded, comprising:
    an arrangement configured to detect maximum values and to transmit for fault detection purposes only one of (i) signals which come from the cylinders having a highest noise generation and (ii) signals from a cylinder that supplies a loudest noise at the knock sensor.

11. A device for one of (i) fault detection and (ii) fault diagnosis in a knock sensor assigned to cylinders of a multi-cylinder internal combustion engine in a predefinable manner, the device configured to perform a method that includes the steps of:
    one of (i) detecting a fault and (ii) diagnosing a fault on the basis of one of (i) at least one cylinder having a highest noise generation and (ii) at least one cylinder that supplies a loudest noise at the knock sensor; and
    detecting fault if a noise-dependent instantaneous value one of (i) exceeds at least one predefinable upper threshold level and (ii) falls below a predefinable lower threshold value.

12. The device according to claim 11, wherein the method includes the step of selecting the loudest cylinder when the internal combustion engine is first placed into operation.

13. The device according to claim 11, wherein the method includes the step of selecting the loudest cylinder by one of measurement of a noise level on a test bed and comparison of one of the output signals emitted from individual cylinders and reference values derived from the output signals emitted from individual cylinders.

14. The device according to claim 13, wherein the fault detecting step includes the substeps of detecting fault on the basis of reference levels formed from predefinable output signals of the knock sensor and detecting fault if an instantaneous reference level one of exceeds an upper reference threshold level and falls below a lower reference threshold level in a predefinable manner.

15. The device according to claim 14, wherein the reference threshold levels are formed from prior reference levels of the loudest cylinder.

16. The device according to claim 14, wherein the fault detecting step includes the substep of detecting fault only when the reference level one of exceeds an upper reference threshold level multiplied by at least one predefinable factor determining a safety range and drops below a lower reference threshold level multiplied by a second factor.

17. The device according to claim 11, wherein the fault detecting step includes the substep of detecting fault only if a fault condition persists for longer than a predefinable applicable period.

18. The device according to claim 11, wherein the threshold levels are stored in an electronic memory device as engine speed-dependent characteristic curves.

19. The device according to claim 11, wherein the method includes the step of initiating, when a fault is detected, replacement measures to ensure safe operation of at least one of the internal combustion engine and a display.

20. A method of fault detection in a knock sensor used to detect knocking in the plurality of cylinders, which is assigned to a plurality of cylinders of a multi-cylinder internal combustion engine in a predefinable manner and which supplies an output signal dependent upon the noise recorded, comprising:
    identifying at least one of the plurality of cylinders as having the highest noise generation during normal operation of the combustion engine;
    detecting a fault only on the basis of at least one of the plurality of cylinders having the highest noise generation during normal operation of the combustion engine; and
    detecting a fault if a noise-dependent instantaneous value one of (i) exceeds at least one predefinable upper threshold level and (ii) falls below a predefinable lower threshold value.

* * * * *